Feb. 17, 1953 W. ISAAC 2,628,848
FOUR-WHEEL STEERING ACTUATED BY CABLE MEANS
Filed Jan. 27, 1948 2 SHEETS—SHEET 1
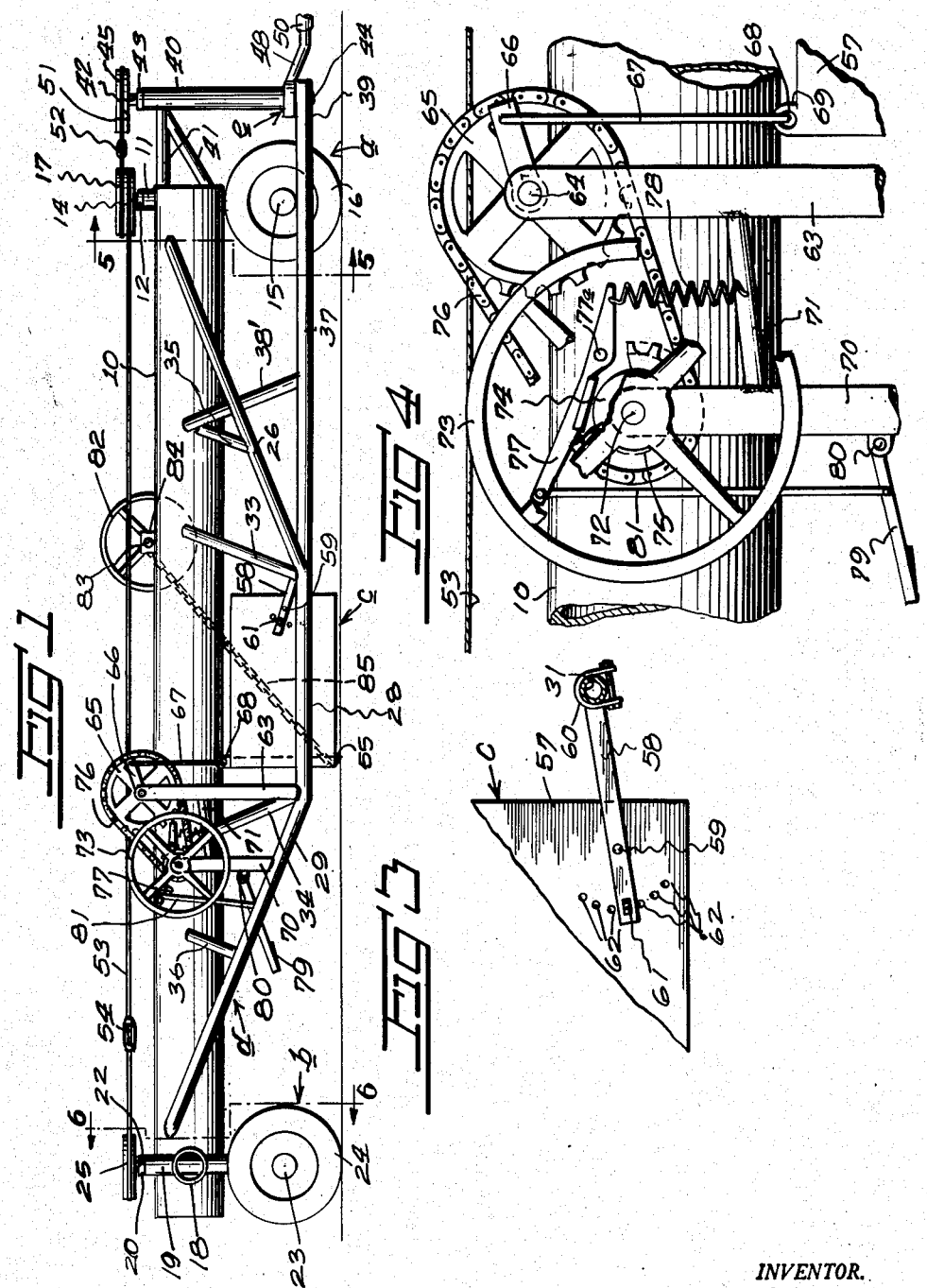
INVENTOR.
William Isaac
BY
Wilfred Lawson
ATTORNEY Feb. 17, 1953 W. ISAAC 2,628,848
FOUR-WHEEL STEERING ACTUATED BY CABLE MEANS
Filed Jan. 27, 1948 2 SHEETS—SHEET 2
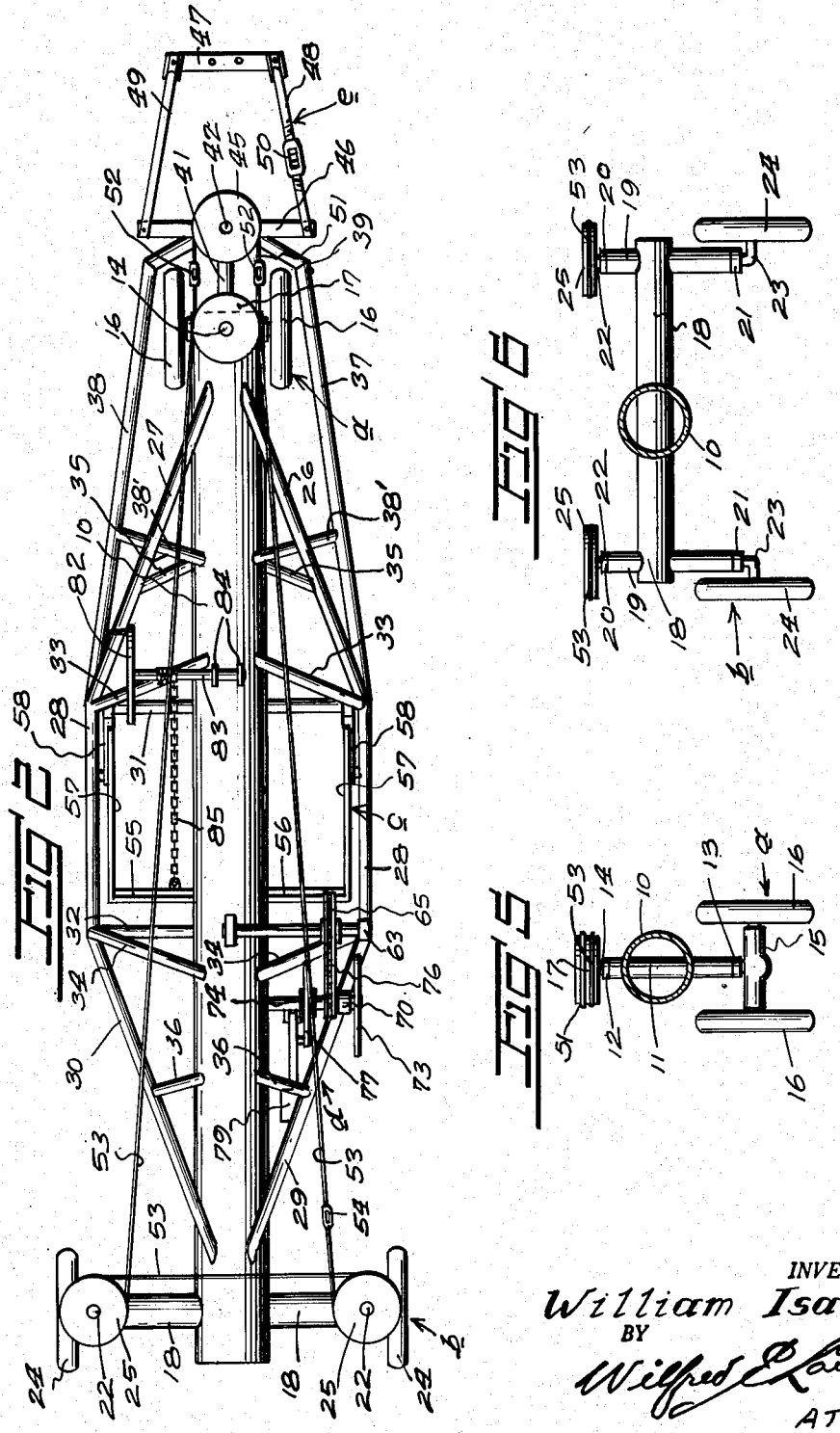
INVENTOR.
William Isaac
BY
Wilfred E. Lawson
ATTORNEY Patented Feb. 17, 1953

2,628,848

UNITED STATES PATENT OFFICE 2,628,848

FOUR-WHEEL STEERING ACTUATED BY CABLE MEANS

William Isaac, Shafter, Calif.

Application January 27, 1948, Serial No. 4,530

2 Claims. (Cl. 280—99)

My invention relates to trailer structure designed particularly for farm use and the main object of my invention is to provide, in combination, a wheeled chassis and a steering mechanism therefor, which is adapted to follow the movements of a tractor or other towing device correctly, when being operated in the field.

Another object of my invention is to provide a chassis of the character indicated having wheels at its front and rear ends interconnected by means of cables or the like in such a manner that they are kept in proper alignment with each other and with the device towing the trailer.

A further object of my invention is to provide a structure of the character indicated above having a winged leveler blade pivotally and adjustably supported by the frame of the chassis and to be secured in raised idle position, so that it does not come into contact with the ground, when the trailer is towed to or from the field.

A still further object of my invention is to provide a trailer of the character indicated above equipped with means for adjusting the leveler blade and holding it in selected adjusted position to level the land at a desired depth.

Other objects of my invention not specifically mentioned may appear in the following specification describing my invention with reference to the accompanying drawing illustrating a preferred embodiment of my invention. It is, however, to be understood, that my invention is not to be limited or restricted to the exact construction and combination of parts described in the specification and shown in the drawing, but that such changes and modifications can be made, which fall within the scope of the claims appended hereto.

In the several figures of the drawing similar parts are designated by similar reference characters and Figure 1 is a view in side elevation of a trailer equipped with a land leveling blade constructed in accordance with an embodiment of the invention;

Figure 2 is a view in top plan;

Figure 3 is a fragmentary view partly in section and partly in elevation illustrating the leveler blade in a second position;

Figure 4 is an enlarged fragmentary view in elevation of the mechanism herein comprised of the means for adjusting the leveler blade;

Figure 5 is a detailed sectional view taken substantially on the line 5—5 of Figure 1; and Figure 6 is a sectional view taken substantially on the line 6—6 of Figure 1.

The land leveler forming the subject matter of my invention comprises a trailer consisting of a long body 10 in the form, preferably of a pipe or tubular member of a large diameter, a front wheel assembly $a$ and a rear wheel assembly $b$. A bearing pipe 11 extends diametrically and vertically through the carriage body or pipe 10 adjacent to the front end thereof. In the top end and in the lower end of the bearing pipe 11, bearings 12 and 13 respectively are mounted and vertical front shaft 14 is arranged in said bearings. A comparatively short front axle 15 is secured to the lower end of the front shaft and on each end of this axle a front wheel 16 is rotatably mounted. On the top end of the front shaft 14 a pulley wheel 17 is firmly secured.

A supporting pipe 18 extends diametrically and horizontally through the carriage pipe 10 adjacent to the rear end thereof, and a rear bearing pipe 19 extends diametrically and vertically through the horizontal supporting pipe 18 adjacent to each end thereof. In the upper end of each vertical bearing pipe 19 a bearing 20 is arranged and in the lower end of each of these pipes a bearing 21 is located. A vertical rear shaft 22 extends through each vertical bearing pipe 19 and is rotatably arranged in the corresponding bearings. On the lower end of each vertical rear shaft 22 a horizontally and outwardly projecting short rear axle 23 is formed and on each of these axles a rear wheel 24 is rotatably mounted. On the top end of each vertical rear shaft 22 a rear pulley wheel 25 is rigidly mounted.

A transversely extending winged leveler blade $c$ is arranged underneath the carriage pipe 10 between the front wheel assembly $a$ and the rear wheel assembly $b$ and is supported by a frame $d$ secured on the carriage pipe. This frame comprises two forward truss rods 26 and 27 respectively, which are secured by welding or the like to the carriage pipe 10 adjacent to its forward end somewhat behind the forward bearing pipe 11 and extend laterally, rearwardly and downwardly from said carriage pipe, ending at a level a little below the axes of the front and rear axles 15 and 23 respectively. From the rear end of each forward truss rod a horizontal side frame member 28 extends rearwardly, so that these two frame members run parallel to each other. Two rear truss rods 29 and 30 respectively are secured by welding onto the carriage pipe somewhat in front of the supporting pipe 18 and extend forwardly, laterally and downwardly from said carriage pipe meeting the rear ends of the horizontal side frame members and are fastened to said ends. The two forward ends of the side frame members 28 are connected with each other by a front transverse truss rod 31 and the two rear ends of said side frame members are connected with each other by a rear transverse truss rod 32. Two front brace struts 33 extend between and are fastened to the front ends of the side frame members 28 and the carriage pipe 10, and two rear brace struts 34 are provided, connecting the rear ends of said side frame members and said pipe. Another pair of front struts 35 are arranged between the front truss rods 26 and 27 and the carriage pipe 10 intermediate the front and rear ends of said truss rods and an additional pair of rear struts 36 is located between the rear truss rods 29 and 30 and the carriage pipe 10 intermediate the front and rear ends of the rear truss rods.

Two horizontal forward side frame members 37 and 38 respectively extend forwardly and inwardly from the forward ends of the side frame members 28 and are securely connected with each other by an arcuate front frame member 39. The forward side frame members 37 and 38 extend forwardly beyond the front wheels 16, so that the arcuate frame member is located at a distance in front of the front wheels. A pair of struts 38' is arranged between the forward side frame members 37 and 38 and the carriage pipe 10.

A vertical bearing pipe 40 is secured to the front end of the carriage pipe 10 by means of a forwardly extending bracket 41, so that a vertical shaft 42 extending through a bearing 43 located in the upper end of the bearing pipe 40 is supported rotatably in a thrust bearing 44 set into the arcuate frame member 39. A pulley wheel 45 is rigidly mounted on the top end of the vertical shaft 42.

A four sided hitch e has a rear bar 46 firmly connected at its longitudinal center with the vertical shaft 42 between the arcuate frame member 39 and the bearing pipe 40. The hitch comprises also a front bar 47 adapted to be rigidly attached to a tractor or the like (not shown). The front and rear bars of the hitch e are connected with each other on their ends by side rods 48 and 49 respectively, each of which may be formed by front and rear parts connected with each other by turnbuckles 50. The front bar 47 of the hitch is, as stated, adapted to be rigidly secured to a tractor or the like (not shown), so that the hitch will pivot about the axis of the vertical hitch shaft 42, whenever the direction of travel of the tractor is changed. An endless hitch cable 51 is trained over the hitch pulley wheel 45 and the front carriage pulley 17, and is adapted to be tautened by means of turnbuckles 52, so that the front axle 15 will be turned with the vertical front carriage shaft and the front wheels 16 trail the tractor always perfectly. An endless carriage cable 53 is trained over the front carriage pulley 17 and extends rearwardly therefrom. This cable extends then around the rear carriage pulleys 25, so that it surrounds each of these pulleys from the inside to the outside and extends in front of said pulleys from one of them to the other. The carriage cable 53 may be equipped with turnbuckles 54 to tauten it.

Since the rear carriage pulleys 25 are mounted rigidly on the vertical rear shafts 22 and each rear axle 23 is formed integrally with the corresponding rear shaft, the rear wheels 24 will be always adjusted to be in the proper alignment to trail the front wheels 16.

The winged leveler blade c comprises a transverse blade bar 55 having a somewhat hollowed surface and secured to an upwardly extending rear wall 56 adjacent to the lower edge thereof, and inclines a little forwardly and downwardly therefrom. On each side edge of the rear wall 56 a side wing 57 is firmly secured or integrally formed therewith and extends forwardly therefrom at a right angle. A pivot bar 58 is pivotally mounted intermediate its ends by means of a pivot stud 59 onto each side wing 57 in the lower forward corner thereof. On the forward end of each pivot bar 58 a clamp 60 is mounted adapted to engage pivotally the front transverse truss bar 31 between the horizontal side frame members 28, whereby the winged leveler blade c is supported, so that the lower edges of the side wings are normally arranged at a level somewhat above the ground and may be pivoted about the pivot pins or studs 59. An adjusting pin 61 extends removably through each pivot bar 58 adjacent to its rear end, and in each side wing 57 a plurality of holes 62 are arranged in an arc, the center whereof is located on the axis of the pivot stud 59, so that the adjusting pins 61 can selectively engage any one of said holes to adjust the distance between the lower edges of the side wings and the ground.

An upward extending post 63 is secured on the junction of one of the horizontal side frame members 28 and of the corresponding rear transverse truss rod 32. This post extends above the carriage pipe 10 and may be reinforced by a stiffener (not shown) extending between these two parts. A horizontal stub shaft 64 is rotatably mounted on the upper end of the post 63, and a sprocket gear 65 and a lever arm 66 are rigidly mounted on said stub shaft. A pitman 67 is pivotally connected at its upper end to the free end of the lever arm 66, and the lower end of the pitman is pivotally connected with a hinge pin 68 supported by a lug 69 arranged on the upper rear edge of the corresponding side wing 57.

A second upwardly extending post 70 is firmly secured on the rear truss rod 29 and is reinforced by a horizontal brace 71 extending between the two posts. A horizontal stub shaft 72 extends outwardly from the second post 70 and is rigidly secured thereto. A hand wheel 73 is rotatably mounted on the stub shaft 72, and a brake drum 74 and a comparatively small sprocket gear 75, also mounted rotatably on said stub shaft, are securely connected with the hand wheel 73. A sprocket chain 76 is trained over the two sprocket gears 65 and 75, so that the leveler bar blade 55 may be raised or lowered by rotating the hand wheel, which turns the small sprocket gear 75 driving the other sprocket gear 65 rigidly mounted on the first stub shaft 64 pivoting the lever arm 66, which raises or lowers the winged leveler blade c by means of the pitman 67. The winged leveler blade pivots about the front transverse truss rod 31 adjusting the blade bar 55 in the desired level.

A brake lever 77 is pivotally supported at 77a intermediate its ends on the carriage pipe 10 and a helical spring 78 fastened with its lower end to the brace 71 and with its upper end to the front end of the brake lever 77 pivoting the brake lever into working engagement with the brake drum 74. A pedal lever 79 is pivotally mounted with its front end on the rear surface of the second post 70 as shown at 80 and a connecting rod 81 is pivotally connected at one of its ends to the rear end of the brake lever 77 and at its other end to the pedal lever 79 intermediate its ends, so that the brake lever may be forced downwardly, extending the spring 78 to engage the brake drum.

In order to lift the blade to a level above the ground while the device is transported from field to field or is drawn over the highway, a hand wheel 82 is rigidly mounted on a horizontal shaft 83 pivotally supported by a pair of lugs 84 secured to and projecting upwardly from the carriage pipe 10. An adjusting chain 85 is fastened at one of its ends to the lower portion of the rear wall 56 and at its other end to the horizontal adjusting shaft 83, so that the leveler blade c may be pivoted upwardly about the front transverse truss rod 31 by winding the chain 85 onto the adjusting shaft 83.

It is to be understood that the pin 61 must be removed from the holes 62 to allow the blade c to pivot forwardly and upwardly on the pivot bar 58 and the front transverse truss rod 31.

When the leveler is to be used, the leveler blade is arranged at approximately ground level, so that it levels any high spots, while being drawn over the field, and deposits any dirt accumulated in front of it in depressions.

I claim:

1. In a trailer of the class described, a chassis having a pair of steering wheels mounted on a common axle adjacent its forward end and a second pair of wheels independently mounted adjacent its rear end, in combination with a steering means, said steering means comprising a shaft rising from each of the mountings of said second wheels, another shaft rising from the center of said axle, a pulley mounted on the upper end of each of said shafts, a steering rod mounted vertically for turning movements at the forward end of the chassis, a draft coupling operatively connected with said rod, another pulley mounted on the upper end of said rod in a common plane with respect to the other of said pulleys, and an endless flexible connector trained about said pulleys and fastened at opposite points on the periphery of the pulley on the said another shaft so that both pairs of the wheels of the chassis will be turned simultaneously in opposite directions necessary to trail the direction of travel of the draft medium connected with the said coupling.

2. The invention as defined in claim 1, with the said chassis comprised in a longitudinally disposed length of tubing, a second relatively short length of tubing of a smaller diameter extending vertically through the first tubing at the forward end of the chassis and constituting a bearing for said steering rod, a third length of tubing of a lesser diameter than that of the first tubing extending crosswise through the latter adjacent the rear end of the chassis, and other lengths of tubing of a diameter substantially equal to that of said second length of tubing extending vertically through the opposite ends of the said third length of tubing and constituting bearings for the shafts of the said second pair of wheels.

WILLIAM ISAAC.

REFERENCES CITED

The following references are of record in the file of this patent:

UNITED STATES PATENTS

| Number | Name | Date |
|---|---|---|
| 433,116 | Ashley | July 29, 1890 |
| 528,890 | Newport | Nov. 6, 1894 |
| 973,711 | Sevison | Oct. 25, 1910 |
| 1,005,909 | Weaver | Oct. 17, 1911 |
| 1,087,153 | Todd | Feb. 17, 1914 |
| 1,890,649 | Jarmin | Dec. 13, 1932 |
| 2,124,625 | Marvin | July 26, 1938 |
| 2,241,193 | Garnett et al. | May 6, 1941 |
| 2,389,752 | Avery | Nov. 27, 1945 |
| 2,453,311 | Fedevich | Nov. 9, 1948 |
| 2,458,666 | Williams | Jan. 11, 1949 |
| 2,483,634 | Williams | Oct. 4, 1949 |

FOREIGN PATENTS

| Number | Country | Date |
|---|---|---|
| 135,035 | Austria | Oct. 25, 1933 |